(No Model.)

N. CLARKSON.
ICE CREAM FREEZER.

No. 476,518. Patented June 7, 1892.

Witnesses
C. E. Ashley
H. W. Lloyd

Inventor
Nicholas Clarkson
By his Attorney
C. E. Davidson

UNITED STATES PATENT OFFICE.

NICHOLAS CLARKSON, OF NEW YORK, N. Y.

ICE-CREAM FREEZER.

SPECIFICATION forming part of Letters Patent No. 476,518, dated June 7, 1892.

Application filed August 5, 1891. Serial No. 401,723. (No model.)

*To all whom it may concern:*

Be it known that I, NICHOLAS CLARKSON, a citizen of the United States, residing in the city, county, and State of New York, have invented certain new and useful Improvements in Ice-Cream Freezers, of which the following is a specification.

My invention relates to a machine for making ice-cream, water-ice, &c.; and the object of my invention is to provide an improved freezer whereby two or more kinds of flavors of ice-cream may be frozen at the same time and with great rapidity.

In carrying out my invention I use a cylinder for containing the refrigerating material, having corrugations formed in its circumference in lines parallel to the direction of its rotation. By the use of this corrugated cylinder I am enabled to freeze the mixture more quickly than with an ordinary cylinder, as a more extended surface is presented to the mixture to be frozen.

My invention is illustrated in the accompanying drawings, in which—

Figure 1:
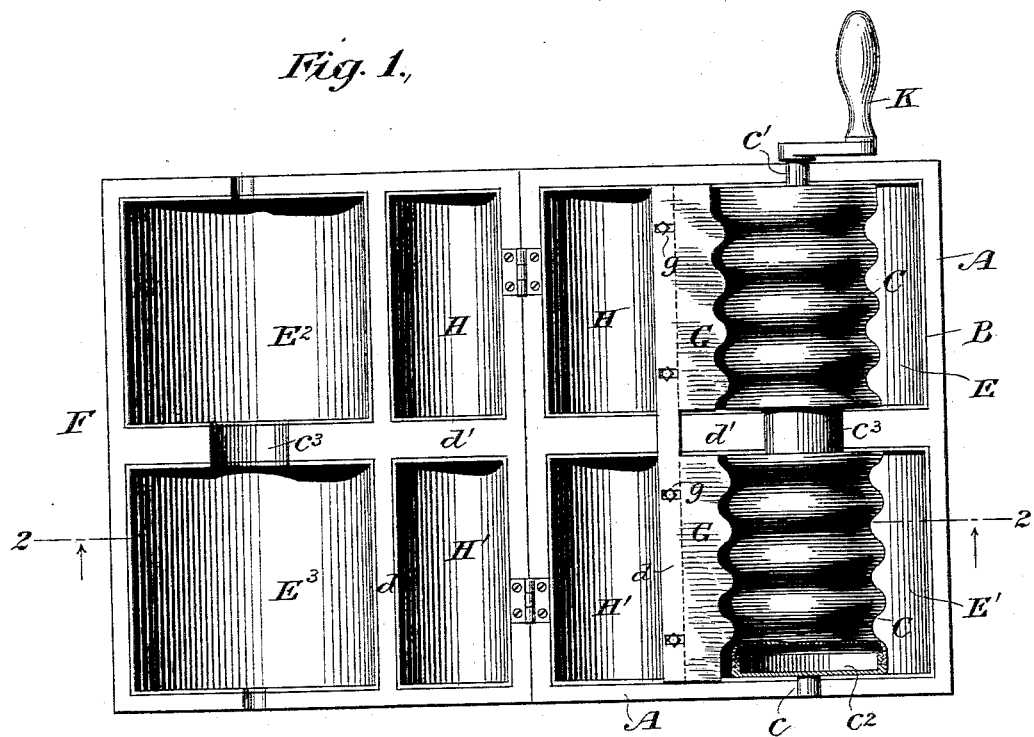
Figure 2:
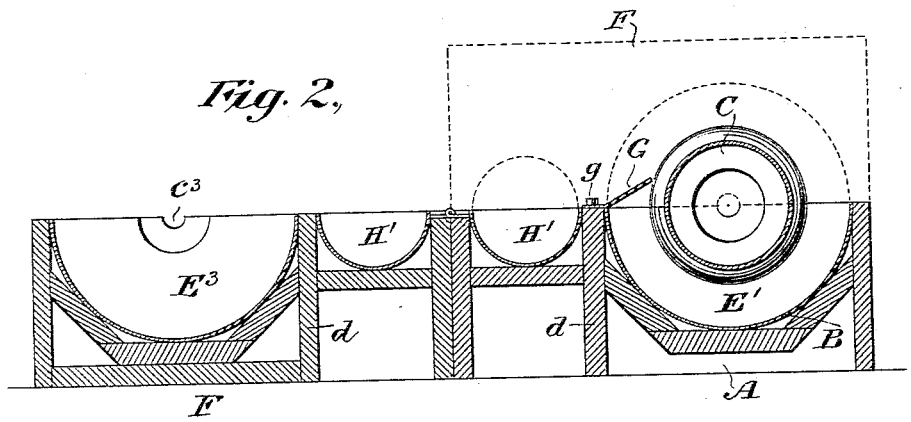

Figure 1 is an interior view of the freezer with its attached cover, and Fig. 2 is a vertical transverse section in the plane of the line 2 2 of Fig. 1.

Referring to the drawings, A represents the outside box, of wood or other suitable material, and B the lining, preferably of tin. The inside of this box is divided into four compartments by the longitudinal partition $d$ and the vertical partition $d'$.

Through the compartments E E', which are designed to hold the mixture which is to be frozen, passes a cylinder C, which contains the cracked ice and salt or other refrigerating material. One end of the cylinder C is journaled at $c$, and the other end, which is supported in a similar manner at $c'$, is provided with a crank K for revolving the cylinder. The center of the cylinder is of small diameter and turns in a bearing $c^3$ in the partition $d'$. One end of the cylinder C is permanently closed, while the other end is provided with a removable cap $c^2$. The cylinder has corrugations formed in its circumference in lines parallel to the direction of its rotation, as shown in the drawings.

The cover F is divided by cross-partitions $d\ d'$, corresponding with the divisions of the box itself, and is designed, when closed, to fit tightly upon the box, so as to make it practically air-tight, the bearings at $c\ c'\ c^3$ fitting closely over the corresponding portions of the cylinder.

The substance to be frozen is placed within the compartments E E', and as these compartments are divided by a water-tight partition $d'$, as hereinbefore explained, a mixture of one flavor may be placed in one compartment and a mixture of a different flavor in the other. For instance, chocolate ice-cream might be frozen in one and orange-ice in the other. The cylinder C, having been filled with the refrigerating material and tightly closed by means of the cap $c^2$, is then placed in position and the cover closed. The cylinder is then revolved for a short time, from one-half a minute to a minute being sufficient to freeze the mixture. The box is then opened, a knife G is affixed to the partition $d$ by screws $g$ or other convenient means, and the cylinder revolved again. This knife is set so as to rest against the exterior of the cylinder, the corrugations upon its edge fitting into the corresponding corrugations upon the cylinder. The blade is cut away at the partition $d'$, as shown. The knife $d$ is a little inclined, so that as the cylinder C is revolved the frozen mixture will be scraped off the cylinder by the knife G and will fall into the compartments H and H', the mixture from E going into H and that from E' going into H'. The knife may be then removed and the cover closed, and as the box is practically air-tight the cream will remain frozen for a considerable time.

The metallic lining of the several compartments may be made so as to be removable and may be of less depth than the box, leaving a space in which may be placed some of the refrigerating material.

I claim as my invention—

1. An ice-cream freezer consisting of a box divided into two or more compartments, substantially as described, each of said compartments being fitted with a removable vessel of less depth than said compartment, and a cover for closing said box, in combination with a corrugated cylinder for containing refrigerating material, means for revolving said cylinder, and an adjustable knife or scraper, substantially as set forth.

2. In an ice-cream freezer, a rotatable cylinder for containing refrigerating material, having corrugations formed in its circumference in lines parallel to the direction of its rotation, substantially as described.

In testimony whereof I have hereunto subscribed my name this 1st day of August, A. D. 1891.

NICHOLAS CLARKSON.

Witnesses:
OTTO DE PARRIÉ,
CAROLINE E. DAVIDSON.